United States Patent [19]

Lewis

[11] Patent Number: 5,089,582
[45] Date of Patent: Feb. 18, 1992

[54] ENCAPSULATED PALLADIUM COMPLEXES AND ONE PART HEAT CURABLE ORGANOPOLYSILOXANE COMPOSITIONS

[75] Inventor: Larry N. Lewis, Scotia, N.Y.

[73] Assignee: General Electric Company, Schenectady, N.Y.

[21] Appl. No.: 484,286

[22] Filed: Feb. 26, 1990

[51] Int. Cl.$^5$ ............................................. C08G 77/06
[52] U.S. Cl. ..................................... 528/15; 523/200; 523/210; 523/211; 525/478; 528/31; 528/32
[58] Field of Search ........................... 528/15, 31, 32; 525/478; 523/200, 210, 211

[56] References Cited

U.S. PATENT DOCUMENTS 5,015,691  5/1991  Lewis ..................................... 528/15

Primary Examiner—Melvyn I. Marquis
Attorney, Agent, or Firm—William A. Teoli; James C. Davis, Jr.; William H. Pittman

[57] ABSTRACT

Inclusion compounds of a cyclodextrin, such as $\beta$-cyclodextrin, and a palladium halide-diene complex, such as a complex of $PdCl_2$ and 1,5-cyclooctadiene have been found to be effective hydrosilylation catalysts. One part heat curable organopolysiloxane compositions are also provided.

4 Claims, No Drawings

ENCAPSULATED PALLADIUM COMPLEXES AND ONE PART HEAT CURABLE ORGANOPOLYSILOXANE COMPOSITIONS

BACKGROUND OF THE INVENTION

The present invention relates to one part heat curable organopolysiloxane compositions having improved shelf stability. More particularly, the present invention relates to the encapsulation of a palladium halide complex, such as $CODPdCl_2$, where COD is 1,5-cyclooctadiene, with beta cyclodextrin (BCD) and the use of the resulting inclusion compound as a hydrosilylation catalyst.

Prior to the present invention, as shown by Kookootsedes et al., U.S. Pat. No. 3,445,420, one part heat curable organopolysiloxane compositions were based on a platinum catalyzed silicon hydride-silicon vinyl addition reaction which generally utilized an inhibitor for the platinum catalyst. The purpose of the inhibitor was to slow down the hydrosilylation reaction to increase the work life of the one component organopolysiloxane mixture at low or room temperatures. The organopolysiloxane mixtures were generally composed of a base polymer consisting of a polydiorganosiloxane having chemically combined methylvinylsiloxy units which was used in combination with a siliconhydridesiloxane. Additional inhibited one package silicon hydride-silicon vinyl one package platinum addition curable organopolysiloxane compositions are shown by Berger et al., U.S. Pat. No. 3,882,083, utilizing an ethylenically unsaturated isocyanurate as an inhibitor, and U.S. Pat. Nos. 4,472,562 and 4,472,563 employing acetylenic unsaturated inhibitors.

In copending application Ser. No. 07/354,557, filed May 22, 1989, now U.S. Pat. No. 5,015,691, one part heat curable organopolysiloxane compositions are described utilizing a platinum catalyst microencapsulated in an organic resin, such as a thermoplastic organic polymer, or a thermosetting organic polymer. The microencapsulated catalyst has an average diameter of about 4-60 microns. Although satisfactory shelf stability can be achieved under ambient conditions using such microencapsulated platinum catalysts in one part mixtures of vinyl-substituted diorganosiloxane fluid and siloxane hydride fluids, it has been found that the capsules often settle to the bottom of the one part heat curable organopolysiloxane mixture, or reduce the transparency of the curable mixture.

In copending application Ser. No. 424,022 filed 10-19-89, now U.S. Pat. No. 5,025,073, one part heat curable organopolysiloxane compositions are shown comprising a vinyl-substituted organopolysiloxane fluid, a siloxane hydride and an effective amount of an inclusion compound of a cyclodextrin with a platinum halide complex with a member selected from a cyclooctadiene and norbornadiene.

Although platinum has been found to be an effective hydrosilylation catalyst, other platinum metals, or salts thereof such as, rhodium and palladium, are constantly being evaluated to provide alternative hydrosilyation catalysts.

SUMMARY OF THE INVENTION

The present invention is based on the discovery that one part heat curable organopolysiloxane compositions can be made by using as a latent hydrosilylation catalyst, an inclusion compound of a complex of a palladium halide and a diene, such as 1,5-cyclooctadiene (COD), with a cyclodextrin, such as $\beta$-cyclodextrin (BCD). It has been found that the use of the aforementioned palladium inclusion compounds in one part heat curable silicone mixtures can provide shelf stabilities exceeding 1 month or more at 50° C. and cured organopolysiloxane products within 85 seconds at a temperature of about 200° C. This result is quite surprising since the inclusion compound of the palladium complex with BCD is found to be more than twice as effective as a hydrosilylation catalyst as compared to the use of the $CODPdCl_2$ palladium complex.

STATEMENT OF THE INVENTION

There is provided by the present invention, one part heat curable organopolysiloxane compositions comprising by weight:
(A) 100 parts of a vinyl-substituted organopolysiloxane fluid,
(B) 1 to 20 parts of a siloxane hydride and
(C) an effective amount of an inclusion compound of a cyclodextrin with a complex of a palladium halide and a member selected from the class consisting of cyclooctadiene and norbornadiene.

The vinyl-substituted organopolysiloxane fluid, hereinafter referred to as the "vinylsiloxane" utilized in the one part heat curable organopolysiloxane compositions of present invention can have a viscosity of from about 100 to 200,000 centipoises. Although vinyl substitution can be on the polysiloxane backbone, a preferred vinyl siloxane is included within the following formula:

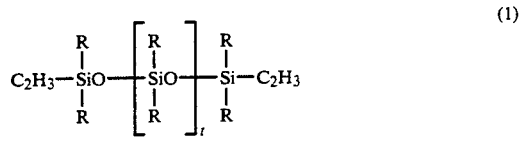

where $C_2H_3$ is vinyl, and R is selected from $C_{(1-13)}$ monovalent organic radicals free of olefinic unsaturation, and t is a positive integer having a value sufficient to provide a vinyl siloxane viscosity of from about 100 to 200,000 centipoises at 25° C. Preferably, R is selected from alkyl radicals of 1 to 8 carbon atoms, such as methyl, ethyl, propyl; monovalent aryl radicals such as phenyl, methylphenyl, ethylphenyl; cycloalkyl radicals, cycloheptyl and haloalkyl radicals such as 3,3,3-trifluoropropyl. Preferably, the vinyl siloxane has terminal units of the formula,

which can vary from about 0.05 to about 3.5 mole percent, based on the total chemically combined siloxy units and preferably from 0.14 to about 2 mole percent.

The vinylsiloxane of Formula (1) can be prepared by equilibrating cyclotetrasiloxane with a vinyl terminated low molecular weight polysiloxane chainstopper. However, if vinyl organosiloxy units are desired in the backbone, a predetermined amount of cyclic vinylorganosiloxane can be used in the equilibration mixture. The chainstopper is preferably a low molecular weight vinyl terminated organopolysiloxane, such as the corresponding disiloxane, trisiloxane, tetrasiloxane. These low molecular weight vinyl terminated polysiloxane polymers are produced by hydrolyzing the appropriate chlorosilanes particularly vinyldiorganochlorosilane along with diorganodichlorosilane to produce the desired vinyl chainstopped polydiorganosiloxanes. The equilibration catalyst which can be used is preferably a mild acid catalyst, such as toluenesulfonic acid or an acid treated clay. An alkali metal hydroxide as the catalyst such as potassium or sodium hydroxide also can be used as the equilibration catalyst When the equilibration has proceeded to the point where about 85% of the cyclopolysiloxane has been converted to linear polymer, the acid catalyst can be neutralized or filtered out. Preferably, excess cyclics are stripped off so that the linear polymer will have a low volatile content.

Included within the siloxane hydride is a "coupler", having the formula,

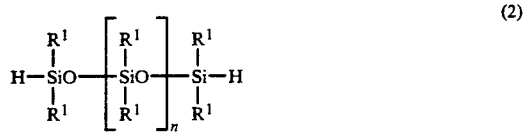

(2)

where $R^1$ is selected from $C_{(1-13)}$ monovalent organic radicals free of olefinic unsaturation and n is an integer having a value sufficient to provide the "coupler" with a viscosity of 1 to 500 centipoises at 25° C. and from about 3 to 9 mole percent of chainstopping diorganohydride siloxy units, based on the total moles of chemically combined siloxy units in the siloxane hydride.

In addition to the coupler of formula (2), the siloxane hydride used in the heat curable polysiloxane compositions of the present invention also can include siloxane hydride resins consisting essentially of the following chainstopping unit,

condensed with silicate ($SiO_2$) units, where the $R_2+H$ to Si ratio can vary from 1.0 to 2.7. A discussion of silicone resins is shown in Rochow Chemistry of the Silicones, pp. 90-94, Second Edition, John Wiley and Sons, New York, 1951, which is incorporated herein by reference. Siloxane hydride resins also can have the above condensed chainstopping units chemically combined with $SiO_2$ units and $(R^3)_2SiO$ units, where the $R^2+R^3+H$ to Si ratio can vary from 1.2 to 2.7, where $R^2$ and $R^3$ are $C_{(1-13)}$ monovalent organic radicals free of olefinic unsaturation and can be selected from $R^1$ radicals.

The siloxane hydride resins can be made by hydrolyzing the corresponding hydride chlorosilanes in the presence of an organic hydrocarbon solvent. To prepare resins having only monofunctional $(R^2)_3SiO_{0.5}$ units and tetrafunctional $SiO_2$ units, there can be cohydrolyzed a hydrogen diorganochlorosilane and tetrachlorosilane. Resins having monofunctional siloxy units, difunctional siloxy units and tetrafunctional siloxy units, can be obtained by hydrolyzing a hydrogendiorganochlorosilane, tetrachlorosilane and a diorganodichlorosilane at particular ratios. Additional siloxane hydride resins are shown by Jeram, U S. Pat. No. 4,040,101 which is incorporated herein by reference.

The siloxane hydride also can include linear organopolysiloxane having the formula,

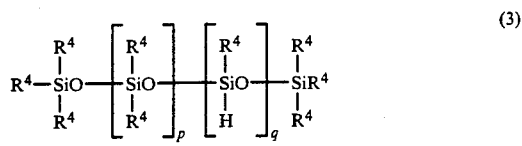

(3)

where $R^4$ is a $C_{(1-13)}$ monovalent organic radical free of olefinic unsaturation, and p and q are integers having values sufficient to provide a polymer having a viscosity of from 1 to 1,000 centipoises at 25° C., and wherein the polysiloxane has from 0.04 to 1.4 by weight of hydrogen.

The siloxane hydride of formula (3) can be produced by equilibrating the appropriate hydrogencyclopolysiloxane with the appropriate cyclopolysiloxane containing R4 substituent groups, in combination with low molecular weight linear triorganosiloxane chainstoppers.

In formulas (2) and (3), and the above siloxane hydride resins, the chemically combined units can have $R^1$, $R^2$, $R^3$ and $R^4$ radicals, which can be the same or different and are selected from alkyl radicals having from 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The siloxane hydride of formula (2) is prepared by either a hydrolysis process or by an acid catalyzed equilibration process. In the equilibration process, cyclopolysiloxane is equilibrated with a low molecular weight hydrogen terminated chainstopper, such as a dihydrogentetraorganodisiloxane. The acid catalyzed equilibration reaction is similar to the method used for the production of the vinyl containing base polymer. In the hydrolysis process, hydrogendiorganochlorosilane is hydrolyzed with diorganodichlorosilanes to produce the polymer of formula (2). The resulting siloxane hydride can be separated from undesirable cyclics by stripping.

The palladium catalyst used in the practice of the present invention can be in the form of an inclusion compound of cyclodextrin, such as β-cyclodextrin, α-cyclodextrin or γ-cyclodextrin, and a palladium halide complex of cycloocta-1, 5-diene, or norbornadiene. For example, an inclusion compound of the complex of the diene-palladium halide and the cyclodextrin can be prepared by adding fine crystals of the diene-palladium halide to a saturated aqueous solution of the cyclodextrin at 40° C. The product which precipitates can be washed with water to remove the remaining cyclodextrin and dried in vacuo. Non-included palladium complex can be removed by washing the residue with tetrahydrofuran and the product recrystallized from water or aqueous ethanol.

An effective amount of the palladium catalyst of the present invention is that amount of inclusion compound which is sufficient to provide from 5 ppm to 1000 ppm of palladium based on the weight of heat curable organopolysiloxane compound composition, and preferably from 100 ppm to 500 ppm.

There can be incorporated in the heat curable organopolysiloxane compositions of the present invention from 5 to 100 parts by weight of a filler based on a 100 parts by weight of the vinyl siloxane. The filler can be selected from fumed silica, precipitated silica and mixtures thereof. Preferably less than 50 parts by weight of filler, per 100 parts by weight of the vinyl siloxane is utilized. In place of the reinforcing filler, such as fumed silica, and precipitated silicas, there may be utilized extending fillers which do not unduly increase the viscosity of the composition in the uncured state, by increasing to some extent the tensile strength of the composition. The reinforcing and extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

Cure of the heat curable compositions of the present invention, can be achieved at temperatures of from 100° C. to 250° C. and preferably 150° C. to 200° C.

In order that those skilled in the art will be better able to practice the present invention, the following examples are given by way of illustration and not by way of limitation. All parts are by weight.

EXAMPLE 1

An encapsulant of a commercially available 1:1 complex of palladium chloride and 1,5-cyclooctadiene(-CODPdCl$_2$) (Engelhardt Corp. of Newark, NJ) was made by initially dissolving 2.04 grams (1.8 mmoles) of β-cyclodextrin (BCD) in 35 ml of water and heating the mixture to 65° C. There was then added 0.5 grams (1.73 mmoles) of CODPdCl$_2$ (an orange solid) with rapid stirring. After two hours, the orange solid had dissolved and an orange precipitate was recovered by filtration. The resulting solid was washed with water, methylenechloride and then dried in vacuo. Based on method of preparation the solid was an inclusion compound of a complex of palladium chloride with 1,5-cyclooctadiene and β-cyclodextrin. Analysis for Pd showed calculated: 7.47, found 7.42.

EXAMPLE 2

A stock mixture for a one part heat curable organopolysiloxane composition was prepared by combining 4.5 grams of a vinyl terminated polydimethylsiloxane having a viscosity of 3,000 centipoises at 25° C. with 0.5 gram of a trimethylsiloxy terminated fluid consisting essentially of condensed dimethylsiloxy units and methylhydrogensiloxy units having about 0.8 mole % of condensed methylhydrogensiloxy units based on the total moles of condensed siloxy units.

A one part heat curable organopolysiloxane composition was prepared by injecting sufficient palladium inclusion compound of Example 1 into a portion of the aforementioned organopolysiloxane stock mixture. It was found that gelation of the mixture occurred in three hours at 130° C. The same mixture was heated to 192° C. and gelation occurred in 20 minutes.

A one part heat curable organopolysiloxane composition is also made using an equivalent amount of the organopolysiloxane stock mixture and injecting 100 ppm of a platinum catalyst in the form of a platinum vinyldisiloxane as shown by Karstedt, U.S. Pat. No. 3,715,334. It was found that gelation of the mixture occurred in less than 2 minutes at 130° C.

EXAMPLE 3

A further evaluation was made with the inclusion compound of Example 1. The ingredients of the stock mixture of the one part heat curable organopolysiloxane of Example 2 was used in the study. However, the 1 part heat curable mixture was prepared by initially combining 67 milligrams of the inclusion compound of Example 1, with 10 grams of the vinyl capped polydimethylsiloxane used in the stock mixture of Example 2. The mixture was vigorously hand mixed to provide a base mixture having 500 ppm of palladium. A heat curable mixture was prepared by mixing 1 gram of the base mixture with 0.04 gram of the methylhydrogenpolysiloxane of Example 2. It was found that the mixture gelled within 85 seconds at 200° C. A similar mixture remained ungelled for three weeks at 50° C.

The above procedure was repeated except that in place of the β-cyclodextrin inclusion compound of Example 1, there was used an equivalent amount of CODPdCl$_2$. It was found that the gelation time of the one part heat curable organopolysiloxane composition containing the CODPdCl$_2$ as the catalyst was 186 seconds at 200° C.

The above results show that a significant enhancement in the activity of the palladium as a hydrosilylation catalyst can be achieved when it is employed as an inclusion compound of CODPdCl$_2$ and a cyclodextrin as compared to its use as CODPdCl$_2$.

EXAMPLE 4

A further study was made to determine the relative activity of palladium as a hydrosilylation catalyst using the inclusion compound of Example 1.

A mixture of 0.0485 grams of the inclusion compound of Example 1 was added to a mixture of 4.38 grams of triethoxysilane and 2.7 grams of vinyltrimethylsilane the resulting mixture was refluxed and stirred for 16 hours under ambient conditions. Gas chromatography showed an 80% yield of the corresponding triethoxytrimethylsilethylene and about 20% of unreacted starting material.

The same procedure was repeated except that an equivalent amount of palladium was employed in the form of CODPdCl$_2$. After 16 hours of stirring and refluxing, gas chromatography showed only about 5% yield of the resulting triethoxytrimethylsilethylene addition product.

Although the above examples are directed to only a few of the very many variables which can be employed in the practice of the present invention, it should be understood that the present invention is directed to a much broader variety of inclusion compounds of palladium chloride and diene with a cyclodextrin as well as one part heat curable organopolysiloxane compositions set forth in the description proceeding these examples.

What is claimed is:

1. A one part heat curable organopolysiloxane compositions comprising by weight:
   (A) 100 parts of a vinyl-substituted organopolysiloxane fluid,
   (B) 1 to 20 parts of a siloxane hydride and
   (C) An amount of an inclusion compound of a cyclodextrin with a complex of a palladium halide and a member selected from the class consisting of cyclooctadiene and nonbornadiene which inclusion compound is effective as a latent palladium catalyst.

2. A one part heat curable organopolysiloxane composition in accordance with claim 1, where the vinyl substituted organopolysiloxane fluid is a vinyl substituted polydimethylsiloxane.

3. A one part heat curable organopolysiloxane composition in accordance with claim 1, where the siloxane hydride is a methylsiloxane hydride.

4. A one part heat curable organopolysiloxane composition in accordance with claim 1, where the inclusion compound is an inclusion compound of β-cyclodextrin with a complex of palladium chloride and 1,5-cyclooctadiene.

* * * * *